(12) United States Patent
Ito

(10) Patent No.: US 7,206,666 B2
(45) Date of Patent: Apr. 17, 2007

(54) ACTUATOR UNIT AND MULTI-AXIS ROBOT

(75) Inventor: Katsuhisa Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 10/704,547

(22) Filed: Nov. 12, 2003

(65) Prior Publication Data

US 2004/0193318 A1  Sep. 30, 2004

(30) Foreign Application Priority Data

Nov. 14, 2002 (JP) .............................. 2002-330939
Oct. 17, 2003 (JP) .............................. 2003-357909

(51) Int. Cl.
*G06F 19/00* (2006.01)

(52) U.S. Cl. .................. 700/245; 318/568.24; 901/23; 453/10; 453/32; 453/57

(58) Field of Classification Search ................. 700/245
See application file for complete search history.

(56) References Cited

U.S. PATENT DOCUMENTS

| 6,233,502 B1 * | 5/2001 | Yim ........................... 700/245 |
|---|---|---|
| 6,233,503 B1 * | 5/2001 | Yim et al. ................... 700/245 |
| 6,243,622 B1 * | 6/2001 | Yim et al. ................... 700/245 |
| 6,459,957 B1 * | 10/2002 | Bennett et al. ............. 700/245 |
| 6,636,781 B1 * | 10/2003 | Shen et al. ................. 700/248 |
| 7,076,337 B2 * | 7/2006 | Kuroki et al. .............. 700/254 |

OTHER PUBLICATIONS

Ohkami et al., Operational aspectes of a super redundant space robot with reconfiguration and brachiating capability, 1999, IEEE, p. 178-183.*
Shibata et al., Development of brachiating control system for reconfigurable brachiating space robot, 2002, IEEE, p. 255-259.*

* cited by examiner

*Primary Examiner*—Thomas Black
*Assistant Examiner*—McDieunel Marc
(74) *Attorney, Agent, or Firm*—Oblon, Spivak, McClelland, Maier & Neustadt, P.C.

(57) ABSTRACT

An actuator unit is applied to joints, each movable along two or more axes, such as a hip joint, a knee joint, or an ankle joint of a legged mobile robot. All the moving portions of a power-supply and control-signal harness are accommodated inside the actuator unit, and an electric contact of the actuator unit is on the free end of an output shaft so that a multi-axis robot is easily achieved. The actuator unit has two orthogonal shafts, and is useful to robots having various kinds of joint structures.

20 Claims, 13 Drawing Sheets

FIG. 7A
FIG. 7B
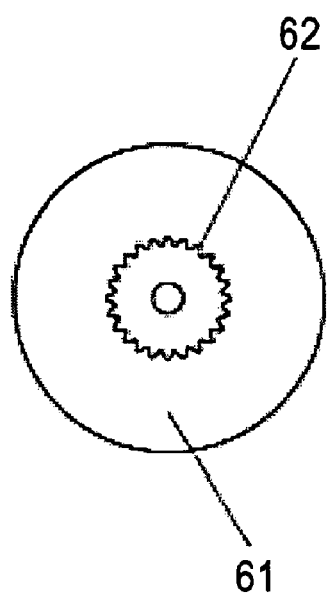
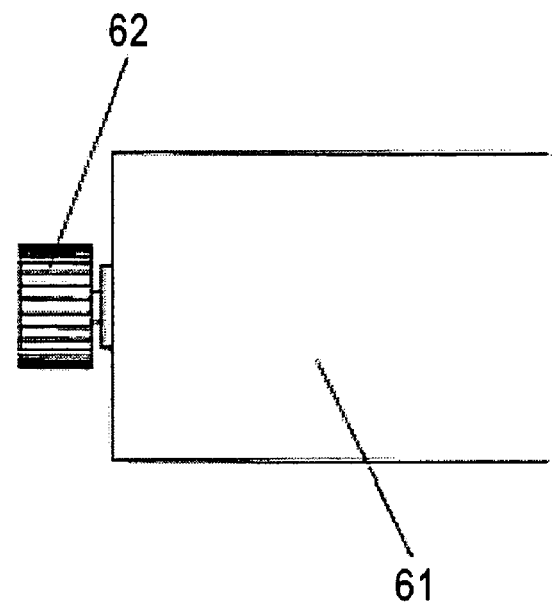

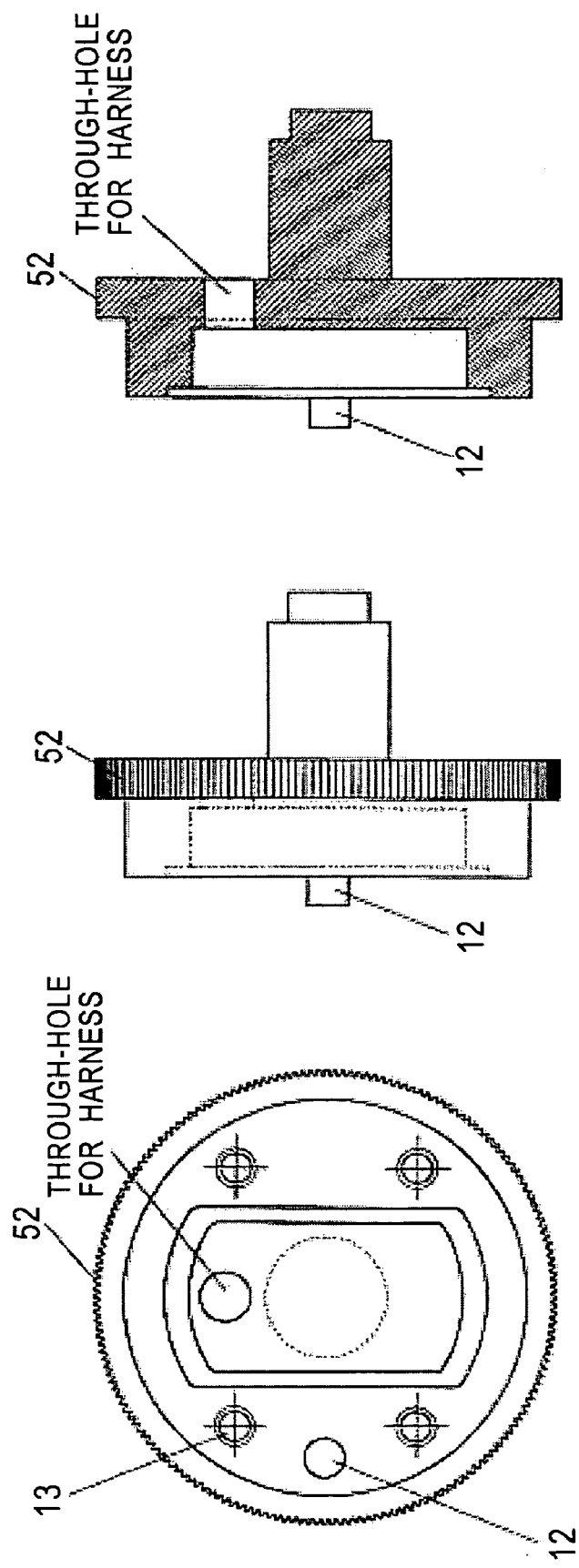

ACTUATOR UNIT AND MULTI-AXIS ROBOT

BACKGROUND OF THE INVENTION

1. Field of the Invention

The present invention relates to an actuator unit that exerts force such as torque in response to an electric signal, and a multi-axis robot including the actuator unit, in particular, to an actuator unit that drives an articulated machine such as a robot, and a multi-axis robot.

More specifically, the present invention relates to an actuator unit that is applicable to joints, each movable along two or more axes, such as a hip joint, a knee joint, or an ankle joint of a legged mobile robot, and relates to a multi-axis robot. More specifically, the present invention relates to a biaxial actuator unit having two orthogonal axes which are easily movable, and relates to a multi-axis robot.

2. Description of the Related Art

A machine that performs human-like movement electrically or magnetically is referred to as "robot". The term "robot" is derived from the Slavish word "ROBOTA (slave machine)". In Japan, robots became popular at the end of the 1960s. Most of them were industrial robots such as manipulators and transfer robots aimed at automation or unmanned operations in manufacturing at factories.

Stationary robots fixedly installed at certain locations, such as robot arms, operate in only predetermined local workspaces, for example, for selecting and assembling parts. On the other hand, mobile robots, which flexibly move in a predetermined or a free path and operate in unlimited workspaces, can be agents for predetermined or any human tasks, or can provide various kinds of services in place of human beings, dogs, or other living beings. Legged mobile robots, among others, are superior to crawler or tire-wheeled robots in terms of being capable of climbing up and down stairs and ladders, riding over obstacles, and walking and running flexibly on both even and uneven grounds, although the postures and walking of the robots are unstable and difficult to be controlled.

Recently, research and development of the legged mobile robots have made progress and expectations of the practical applications are growing, which are pet robots simulating the body mechanism and motions of quadrupedal walking animals such as dogs and cats, or "man-shaped" or "man-type" robots referred to as "humanoid robots" designed based on the model of human body mechanics and motions.

Such legged mobile robots generally have a plurality of joints capable of moving along any axis by actuator motors. In addition, a servo control reproduces a desired motion pattern by detecting rotation and movements of the motors and then controls the postures.

A servo motor is commonly used to achieve flexible movement of the robot joints. This is because a servo motor is easy to operate and small-sized and has high torque and quick response. In particular, an AC servo motor, which is brushless and maintenance-free, is applicable to a joint actuator of a legged robot which preferably operates, for example, walks freely in an unmanned workspace. The AC servo motor has a permanent magnet in a rotor and a multi-phase coil (for example, a three-phase coil) in a stator and is designed to generate torque of the rotor from sine-wave magnetic flux distribution and sine-wave electric current.

Generally, the legged mobile robot has many joints. Accordingly, the servo motor that achieves the flexible movement of the joints must be designed and manufactured to be compact and high-performance. For example, a small gear-direct AC servo motor which has a one-chipped servo controller is already available (refer to, for example, Japanese Unexamined Patent Application Publication No. 2000-299970).

Referring to FIGS. 1A and 1B, in such an actuator unit, a power-supply and control-signal harness 2 extends from a body of the actuator 1. Additionally, an output shaft 3 coupled with the rotor of the actuator motor has only a mechanics for fixing a support structure.

As a result, the harness 2 must be designed to extend through a plurality of moving parts when a user or a designer develops a multi-axis robot using such actuator units.

Further, to develop the joints having two or three orthogonal axes, a complicated mechanical design using a belt and a linkage mechanism is required.

Furthermore, the production and the maintenance of the robot using the actuator units are not necessarily efficient.

SUMMARY OF THE INVENTION

Accordingly, it is an object of the present invention to provide an excellent actuator unit applied to actuate joints of an articulated machine such as a robot, and to provide a multi-axis robot including the actuator unit.

It is a further object of the present invention to provide an excellent actuator unit which is applied to joints, each movable along two or more axes, such as a hip joint, a knee joint, or an ankle joint of a legged mobile robot, and to provide a multi-axis robot.

It is a still further object of the present invention to provide an excellent biaxial actuator unit having two orthogonal shafts which are easily movable, and to provide a multi-axis robot, thus facilitating assembly, production, and maintenance of the actuator unit and the multi-axis robot.

According to a first aspect of the present invention, an actuator unit includes two motors, output shafts drivingly connected to rotors of the motors, a housing covering the motors wherein ends of the output shafts exposed to the exterior of the housing, and electric contacts on the ends of the output shafts for electric power and a control signal.

In the actuator unit according to the first aspect of the present invention, all the moving portions of a power-supply and control-signal harness are accommodated inside the actuator unit, and an electric contact of the actuator unit is on the end of each output shaft so that a multi-axis robot is easily achieved due to the easy and low-cost wiring of the harness.

Preferably, a speed-reducer is disposed around the output shaft and reduces the rotational speed of the output shaft at a predetermined ratio.

Preferably, the free end of each output shaft has threaded holes or a detent pin for fixing a support structure such as a linkage or a housing.

Preferably, the actuator unit has built-in control-circuit components including a microprocessor. In this case, the actuator unit contains all the basic functions and the mechanics required for building robots so that even inexperienced engineers can readily achieve robots. In addition, the design and the assembling of various types of the robots are significantly simplified, thereby increasing productivity.

Preferably, harnesses extending from the electric contacts are wound around the shafts in several turns and then are connected to the control-circuit components. Winding the harnesses around the output shafts can prevent the harnesses from being cut when the output shafts rotate.

Preferably, the actuator unit contains two motors whose output shafts are orthogonally disposed. A biaxial actuator having two orthogonal X and Y shafts provides easy design and assembling of multi-axis robots having various kinds of joint structures.

Preferably, electric power and a control signal are input into an electric contact on the end of the output shaft of one of the motors. Inputting the electric power and the control signal into the electric contact on one of the ends of the X-shaft or the Y-shaft can appropriately actuate the two output shafts (X-shaft and Y-shaft).

Preferably, the electric contact on the end of the output shaft of the other motor, which is not used for the input, outputs the electric power and the control signal to actuate another actuator. This output is generated from the input electric power and control signal.

According to a second aspect of the present invention, an actuator unit includes a first container accommodating a first motor and having a first bearing portion to support the first motor, a second container accommodating a second motor and having a second bearing portion to support the second motor such that an output shaft of the second motor is substantially orthogonal to the first bearing. The output shafts of the first motor and the second motor are substantially orthogonally disposed.

The biaxial actuator unit according to the second aspect of the present invention having two orthogonal X and Y shafts provides easy design and assembling of multi-axis robots having various kinds of joint structures.

Preferably, electric power and a control signal are input into an electric contact on the end of the output shaft of one of the motors. Inputting the electric power and the control signal into the electric contact on one of the ends of the X-shaft or the Y-shaft can appropriately actuate the two output shafts (X-shaft and Y-shaft).

Preferably, the electric contact on the end of the output shaft of the other motor, which is not used for the input, outputs the electric power and the control signal to actuate another actuator. This output is generated from the input electric power and control signal.

According to a third aspect of the present invention, a multi-axis robot includes at least two actuator units functioning as joints having high degrees of freedom. Each actuator unit has two motors output shafts of which are orthogonally disposed and the two motors have electric contacts on the ends of the output shafts.

Threaded holes or a detent pin for fixing a support structure, such as a linkage or a housing, may be disposed on the ends of the output shafts. In this case, the actuator units can be combined with the support structures to achieve a part of the robot, such as a leg.

At least three actuator units may be combined to achieve a leg of an articulated robot. For example, the output X-shaft and the output Y-shaft of the first actuator unit correspond to a roll axis and a pitch axis of the hip joint, respectively, and the output X-shaft and the output Y-shaft of the second actuator unit correspond to a pitch axis and a roll axis of the knee joint, respectively, and the output X-shaft and the output Y-shaft of the third actuator unit correspond to a pitch axis and a roll axis of the ankle joint, respectively.

A leg having six degrees of freedom may be composed of a small number of support structures by using the biaxial actuator unit. The design and the assembling of the robots are significantly simplified, thereby increasing productivity.

In each of the actuator units, electric power and a control signal may be input into an electric contact on the end of the output shaft of one of the motors and may be output from an electric contact on the end of the output shaft of the other motor, which is not used for the input, to actuate another actuator.

That is, a daisy-chain configuration may be employed in which the electric power and the control signal are transmitted from the upper to the lower actuator units. If the actuator unit needs repairing, removing the two output shafts completely disconnects the electric route, resulting in an easy replacement of the unit.

In this configuration, since harnesses which connect the electric contacts of the actuator units extend through only the single support structure having no movable parts, a movable harness such as a high-pliable wire is not required, resulting in an easy wiring.

These and other features and advantages of the present invention will be understood upon examining the figures and reading the following detailed description of preferred embodiments of the invention.

BRIEF DESCRIPTION OF THE DRAWINGS

FIGS. 7A and 7B are external views showing a structure of a motor;

FIGS. 9A, 9B and 9C show a plan view, a side elevation view, and a longitudinal sectional view of an output Y-shaft, respectively;

DESCRIPTION OF THE PREFERRED EMBODIMENTS

Embodiments of the present invention will now be described in detail with reference to the drawings.

The present invention provides a multi-axis robot, in particular, an actuator unit which is applied to joints, each movable along two or more axes, such as a hip joint, a knee joint, or an ankle joint.

Figure 1A:
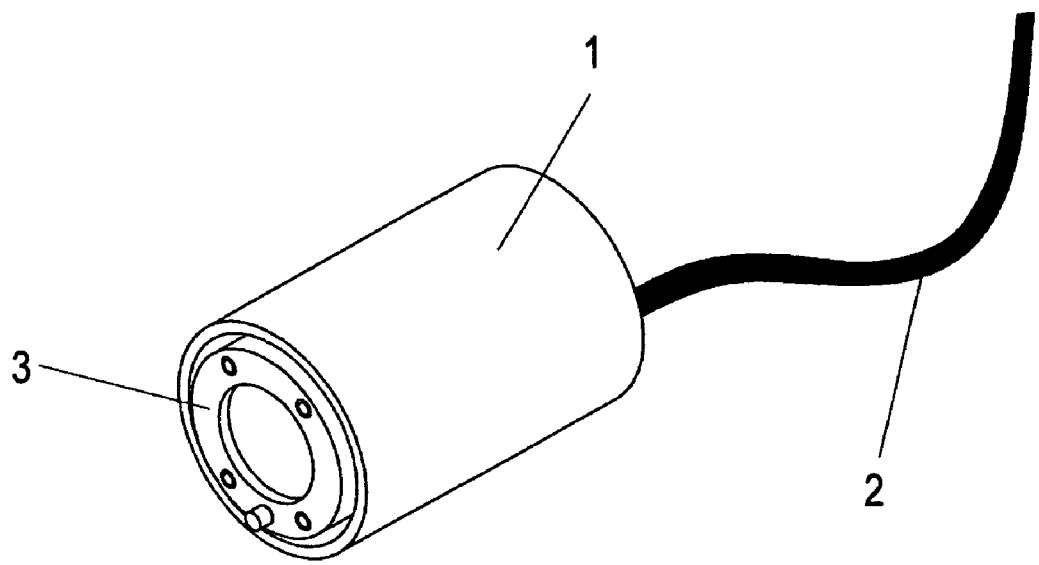
FIGS. 1A and 1B show a structure of a known actuator unit.
Figure 1B:
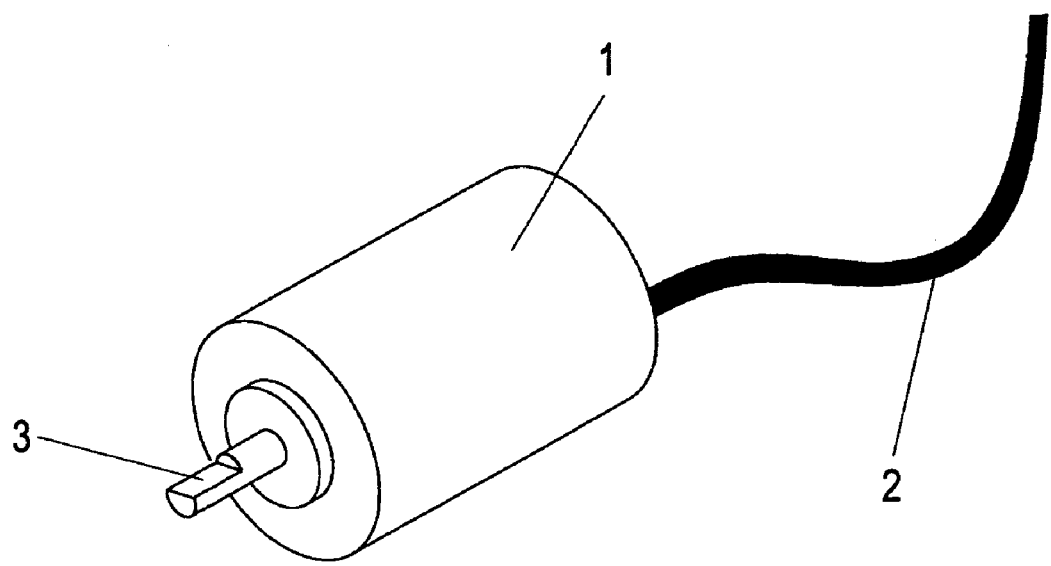
Figure 2:
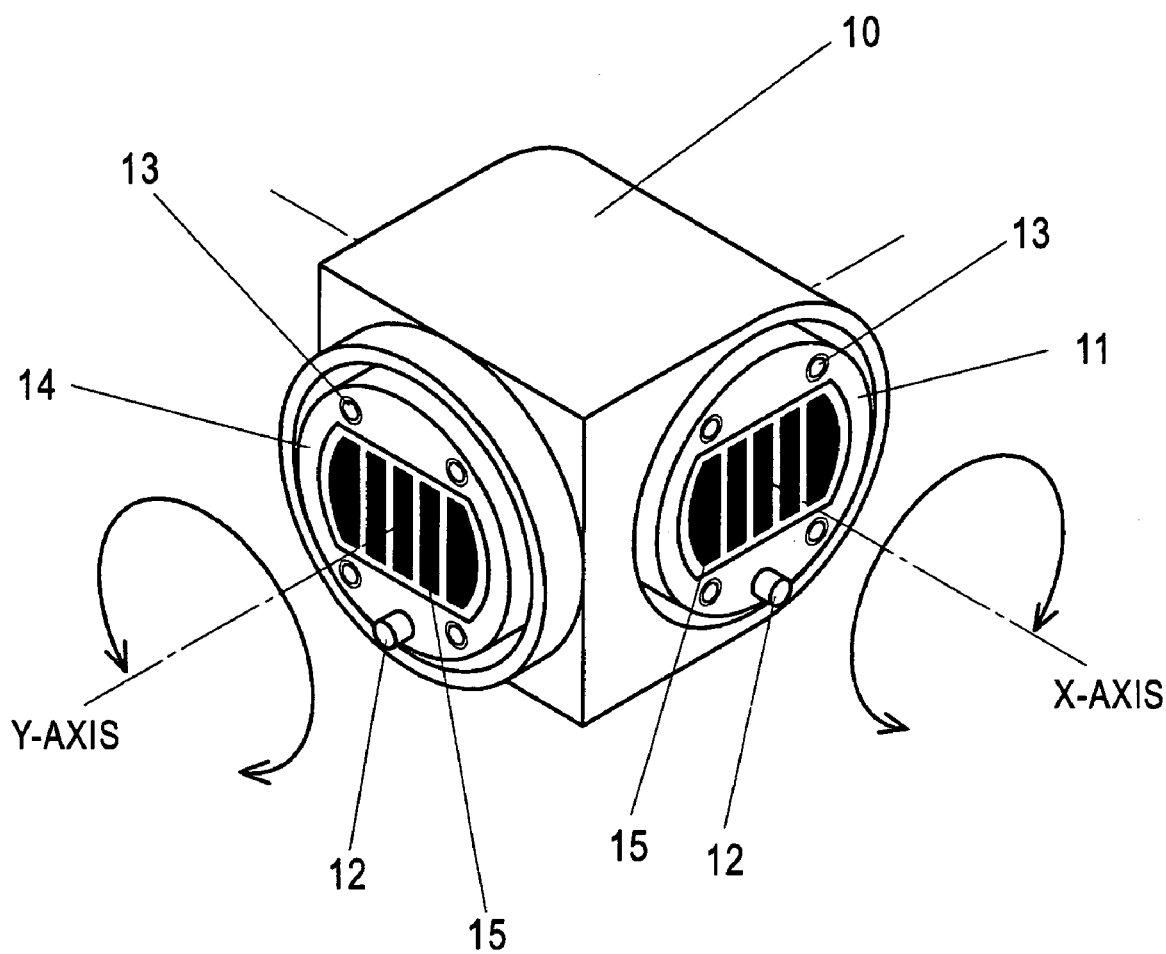
FIG. 2 shows a structure of an actuator unit according to an embodiment of the present invention.

FIG. 2 is an external view showing a structure of the actuator unit according to an embodiment of the present invention.

A housing of the actuator unit 10 is substantially U-shaped in cross-section and two orthogonal output shafts (hereinafter referred to as "X-shaft" and "Y-shaft") are disposed at the front and the top of the U-shaped housing.

The end of each shaft has an electric contact 15 for electric power and a control signal, and four threaded holes 13 or a detent pin 12, which protrudes from the end, for coupling the output shaft with a support structure such as a linkage or a housing. The threaded holes 13 and the detent pin 12 are used for fixing a socket (described hereinafter) in place. The socket mechanically fits to and electrically contacts the end of the output shaft.

Control-circuit components including a microprocessor (not shown) are built-in inside the actuator unit 10. The unit is designed so that the two shafts (X-shaft 11 and Y-shaft 14) are appropriately driven by inputting electric power and a control signal into one electric contact 15 on one of the ends of the X-shaft 11 or the Y-shaft 14.

The electric contact 15 on the other end, which is not used for the input, outputs electric power and a control signal to actuate another actuator. This output is generated from the input electric power and control signal.

As described hereinafter, all the movable portions of a harness are inside the actuator unit 10 and electric contacts 15 of the harness are disposed on the ends of the output shafts 11 and 14. This easy wiring of the harness readily achieves a multi-axis robot and facilitates assembly, production, and maintenance of the robot.

Figure 3A:
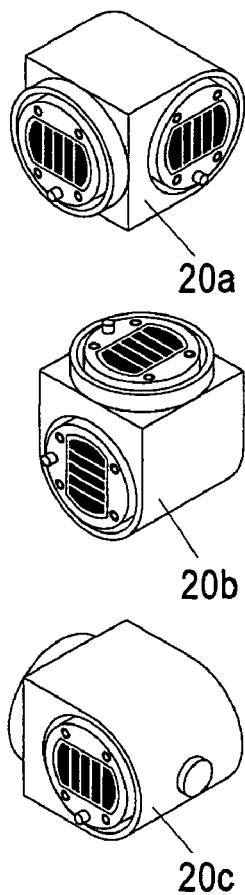
FIGS. 3A and 3B show an exemplary leg structure of a two-legged walking robot including the actuator unit shown in FIG. 2.
Figure 3B:
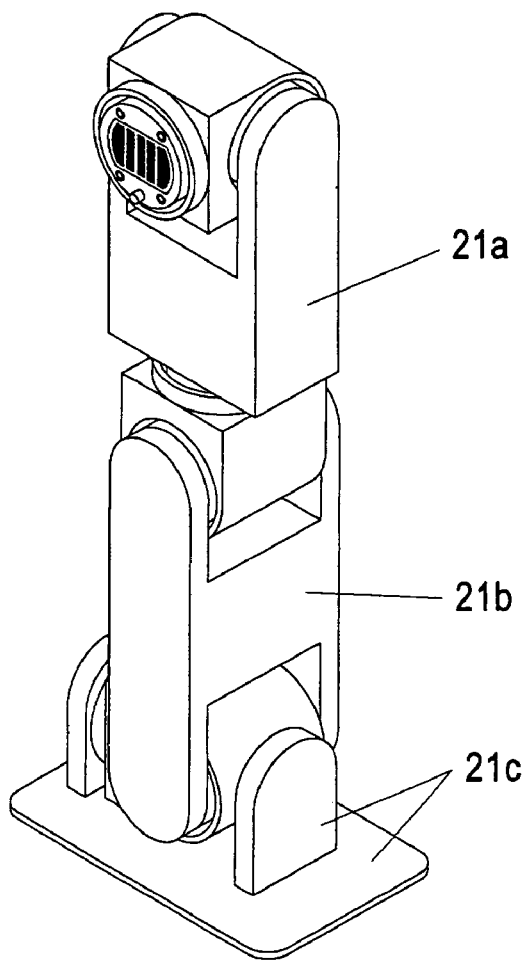

FIGS. 3A and 3B show an exemplary leg structure of a two-legged walking robot including the actuator unit shown in FIG. 2.

As shown in the drawings, the actuator units 20a, 20b, and 20c are arranged at the relative positions shown in FIG. 3A, and then combined with the support structures 21a, 21b, and 21c as shown in FIG. 3B.

In the leg structure shown in FIGS. 3A and 3B, a hip joint having three degrees of freedom is provided by the X-shaft shaft and the Y-shaft of the actuator unit 20a, and the Y-shaft of the actuator unit 20b. The X-shaft of the actuator unit 20b functions as a knee joint and the X-shaft and Y-shaft of the actuator unit 20c function as an ankle joint. That is, the output X-shaft and the output Y-shaft of the actuator unit 20a correspond to a roll axis and a pitch axis of the hip joint, respectively. The output X-shaft and the output Y-shaft of the actuator unit 20b correspond to a pitch axis and a roll axis of the knee joint, respectively. The output X-shaft and the output Y-shaft of the actuator unit 20c correspond to a pitch axis and a roll axis of the ankle joint, respectively.

As shown in FIGS. 3A and 3B, the leg having six degrees of freedom can be composed of a small number of support structures by using the biaxial actuator unit according to the embodiment of the present invention. Also, easy wiring of the harness readily achieves a multi-axis robot and facilitates assembly, production, and maintenance of the robot.

Figure 4:
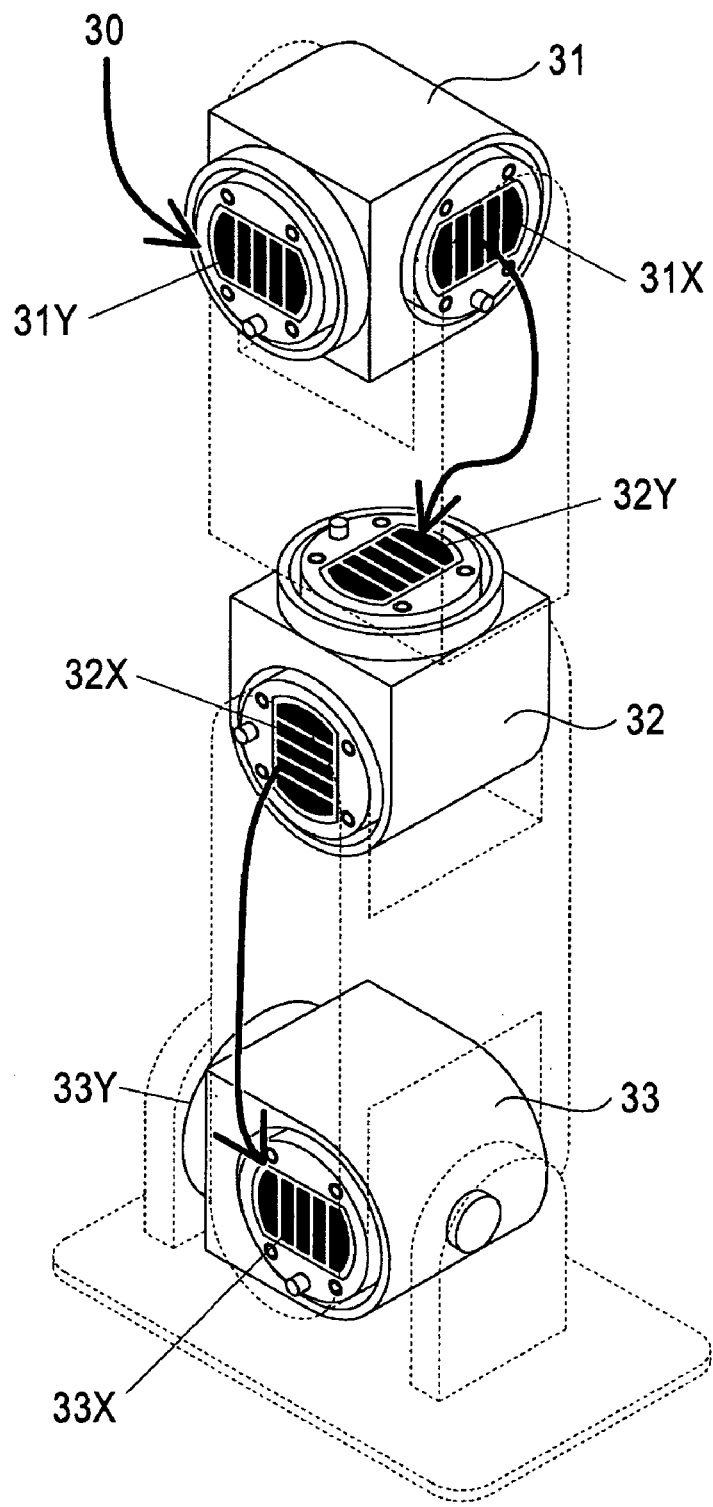
FIG. 4 shows an electrical route of the leg shown in FIG. 3.

FIG. 4 shows an electrical route of the leg shown in FIG. 3B. The electric power and the control signal 30 from an outside upper layer are input into an electric contact 31Y and are output from an electric contact 31X after flowing through an internal circuit of an actuator unit 31.

Furthermore, the electric power and the control signal output from the electric contact 31X of an actuator unit 31 are input into an electric contact 32Y of an actuator unit 32 and are output from an electric contact 32X after flowing through an internal circuit of the actuator unit 32, and then are input into an electric contact 33X of an actuator unit 33.

Thus, a daisy-chain configuration is employed in which the electric power and the control signal 30 are transmitted from the upper (or nearer to a central controller, which is not shown) to the lower (or farther from the central controller) actuator units.

Since a harness which connects the actuator unit 31 to the actuator unit 32, namely, the electric contact 31X to the electric contact 32Y, or the actuator unit 32 to the actuator unit 33, namely, the electric contact 32X to the electric contact 33X extends through only the single support structure having no movable parts, a movable harness such as a high-pliable wire is not required, resulting in an easy wiring.

As can be readily understood from the above description, the actuator unit according to the present invention is biaxial and has an electric contact for electric power and a control signal on each output shaft so that a multi-axis robot is easily achieved. That is, easy wiring of the harness readily achieves a multi-axis robot and facilitates assembly, production, and maintenance of the robot.

Figure 11:
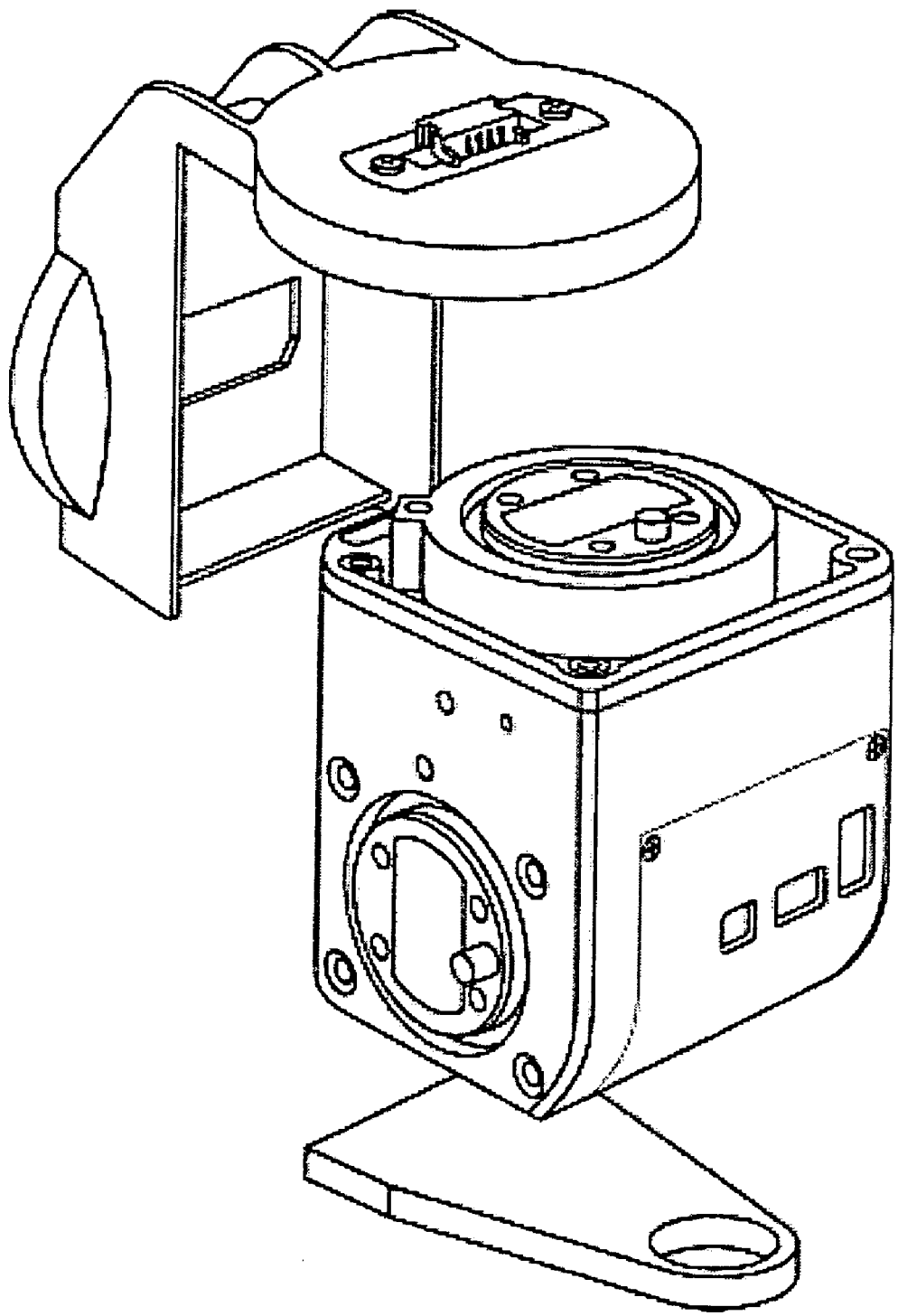
FIGS. 11 and 12 show the step for assembling a structural component and the actuator unit.
Figure 12:
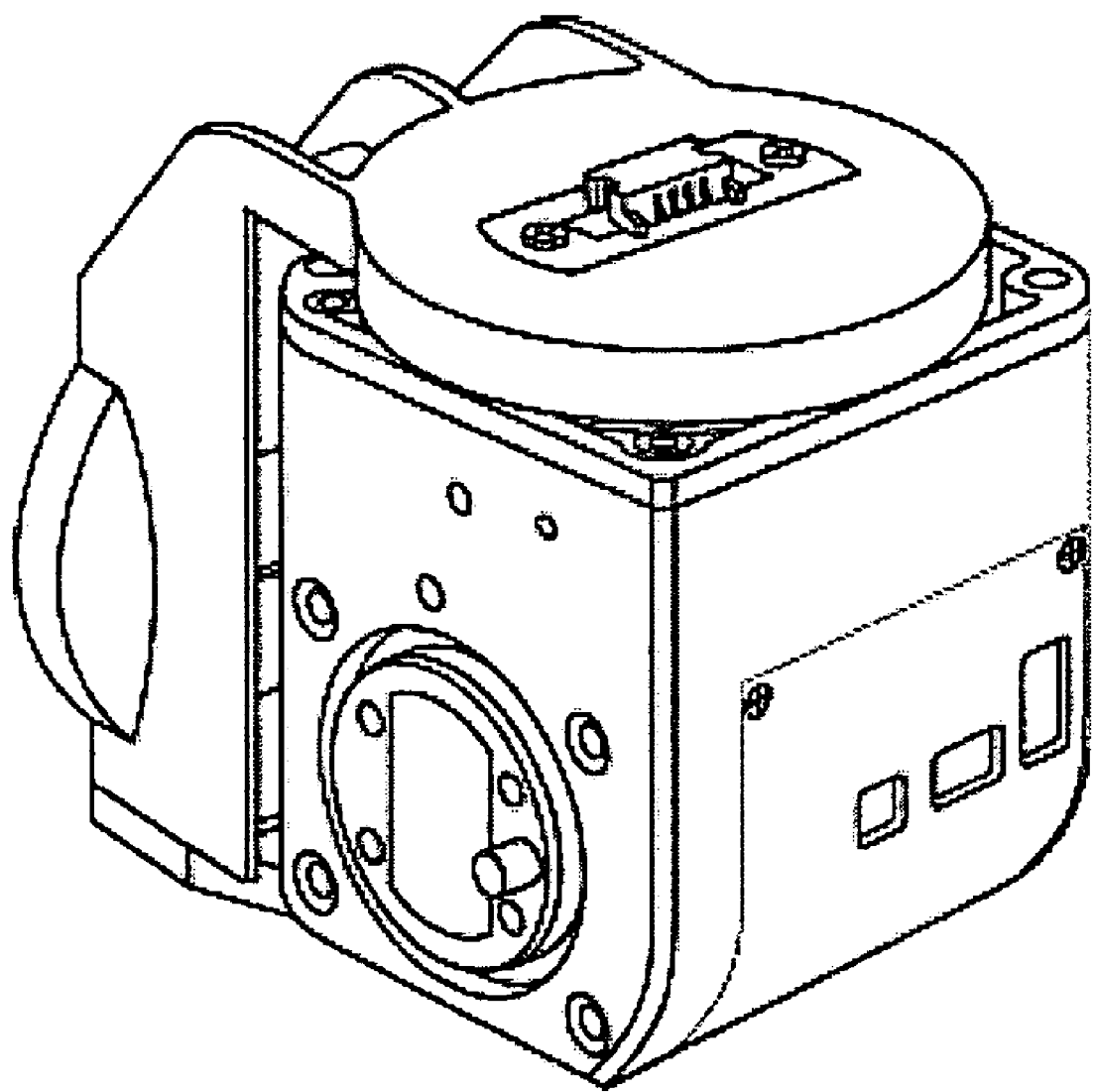

FIGS. 11 and 12 show the step for assembling a structural component and the actuator unit according to the embodiment of the present invention.

In this example, the structural component is composed of a substantially L-shaped part having an electric contact to contact the electric contact on the output X-shaft and a bearing attached to the top end of the L-shape part.

Referring to FIG. 12, the L-shaped part and the bearing of the actuator unit are put into the actuator unit along the X direction. The actuator unit can rotate about the output X-shaft. The L-shaped part has the socket (not shown), which electrically contacts the end of the output X-shaft, on the back surface of the top portion of the L. Also, a dent to which the detent pin fits and holes through which screws are inserted into the threaded holes for fixing the output shaft are formed on the back surface of the top portion of the L (all are not shown).

In the assembled component shown in FIG. 12, although the motor that drives the X-shaft freely rotates, the actuator unit itself rotates in the range of −180 degrees to +180 degree or in a smaller range.

The structural component which rotatably supports the actuator unit is not limited to the shape and the structure shown in FIGS. 11 and 12. That is, various modifications and alternatives can be made without departing from the structure that rotatably supports the output shaft and one of the output shafts of the actuator unit rotates about the shaft.

The output Y-shaft is rotatably supported by a similar structural component although it is not shown in FIGS. 11 and 12. Thus, the structural components for the output X-shaft and the output Y-shaft have orthogonal rotational directions relative to the actuator unit.

Figure 13A:
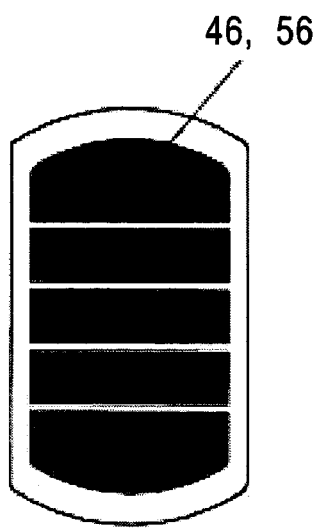
FIGS. 13A, 13B, and 13C show a plan view, a side elevation view, and a longitudinal sectional view of an electric contact on a free end of the output shaft of the actuator, respectively.
Figure 13B:
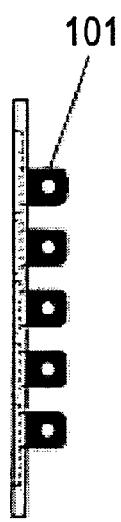
Figure 13C:

FIGS. 13A, 13B, and 13C show a plan view, a side elevation view, and a longitudinal sectional view of the electric contact 46 or 56 on the end of the output shaft of the actuator, respectively. The electric contact 46 or 56 is composed of a plurality of planer terminals (five in the drawing). Solder terminals 101 for connecting a harness, which is connected to wires in the unit, protrude from the back sides of the planer terminals.

Figure 5:
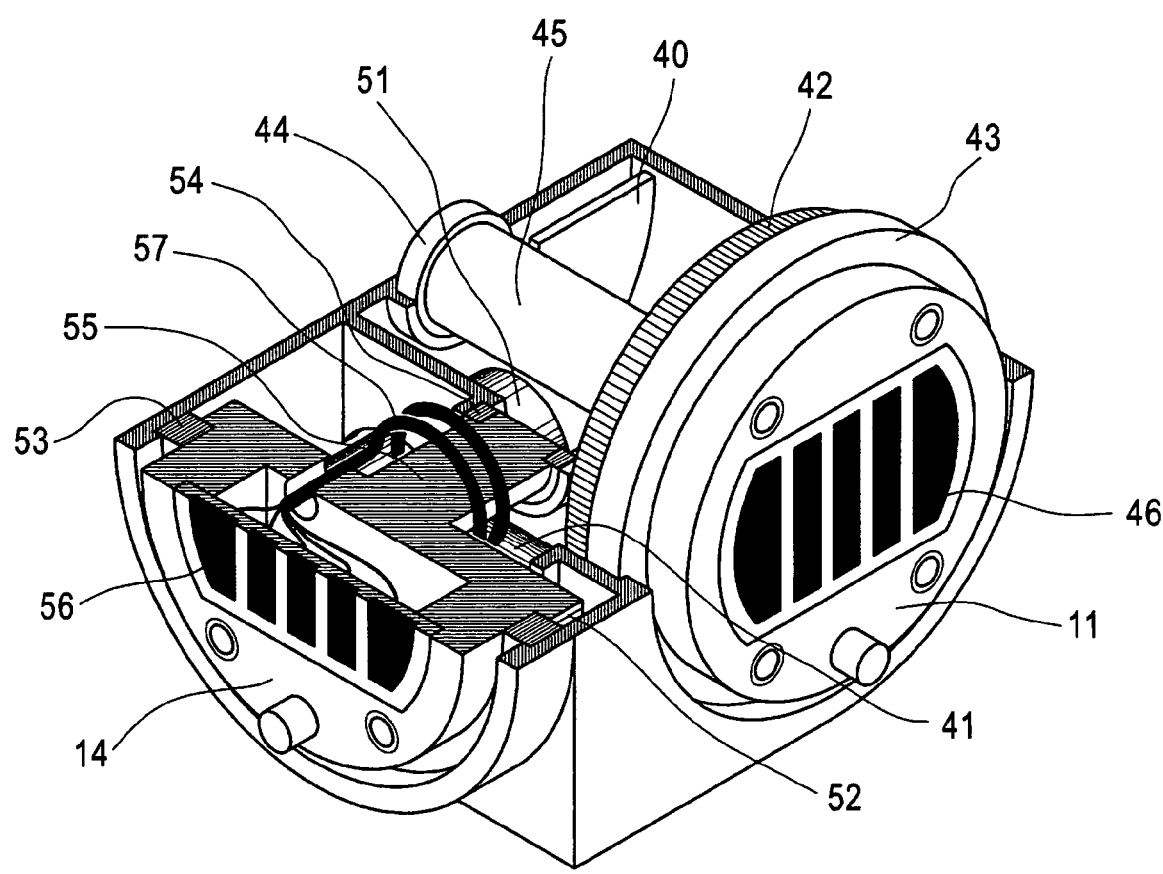
FIG. 5 is a view of the inner structure of the actuator unit shown in FIG. 2.
Figure 6:
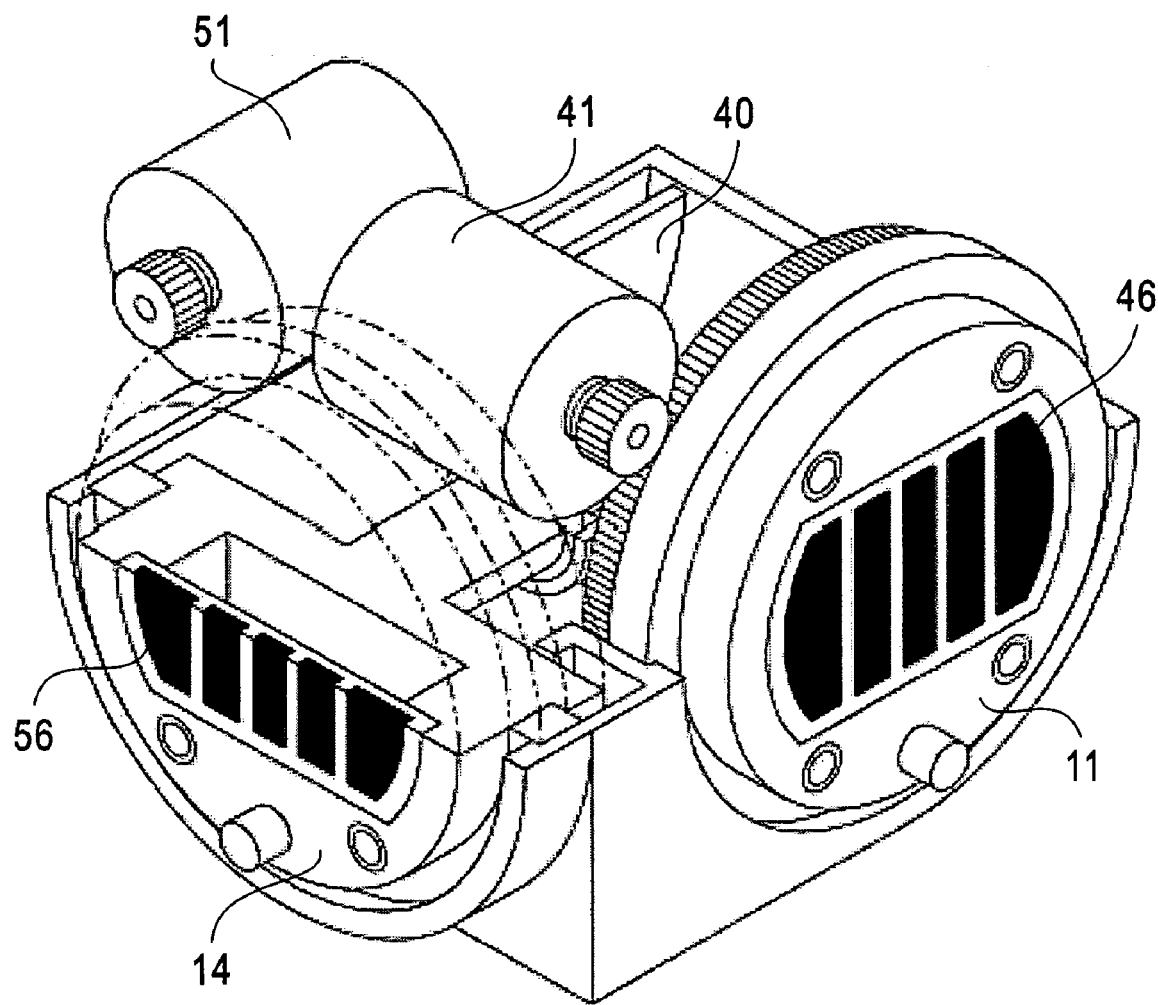
FIG. 6 is another view of the inner structure of the actuator unit shown in FIG. 2.

FIG. 5 is a view of the inner structure of the actuator unit shown in FIG. 2 divided by a plane parallel to the orthogonal output shafts. FIG. 6 is a view of the inner structure in the opposite direction to that in FIG. 5.

Referring to the drawings, motors 41 and 51 are orthogonally disposed from each other inside the actuator unit. In particular, the unit includes a first container which accommodates the motor 41 and a second container which accommodates the motor 51 such that the motor 51 does not interfere with the motor 41.

The first container occupies the lower part of a substantially U-shaped housing. It has a pair of bearings 43 and 44 which rotatably support a shaft 45 such that a output X-shaft 11 connected to the motor 41 is disposed in the direction of the depth of the U-shaped housing, namely, in X-axis direction. One of the ends of the output X-shaft 11 has a gear portion 42 which reduces a rotational speed of the motor 41 at a predetermined ratio and is supported by a bearing 43.

The second container occupies the upper part of the U-shaped housing. It has a pair of bearings 53 and 54 which rotatably support a shaft 55 such that a output Y-shaft 14 connected to the motor 51 is disposed in the direction of the height of the U-shaped housing, namely, in the Y-axis direction. One of the ends of the output Y-shaft 14 has a gear portion 52 which reduces a rotational speed of the motor 51 at a predetermined ratio and is supported by a bearing 53.

Referring to FIG. 5, the shaft 45 of the output X-shaft 11 connected to the motor 41 has a length substantially identical to the depth of the U-shaped housing. That is, the bearings 43 and 44, which support the output X-shaft 11, are mounted at the front and back sides of the housing.

On the other hand, the shaft 55 of the output Y-shaft 14 connected to the motor 51 is disposed in the height direction of the U-shaped housing. The shaft 55 has a short length so that it does not interfere with the motor 41. That is, one of the bearings 53, which support the output Y-shaft 14, is disposed at the top end of the U-shaped housing. The other bearing 54 is disposed substantially at the center of the unit so that the bearing 54 does not interfere with the output X-shaft 11 and separates the first container from the second container.

FIGS. 7A and 7B are external views showing a structure of the motor 41. An external view of the motor 51 is substantially identical. A body 61 of each motor is substantially cylindrical. A rotating shaft protrudes from one of the ends of the body 61. A pinion gear 62 is coupled substantially with the top end of the shaft.

Figure 8A:
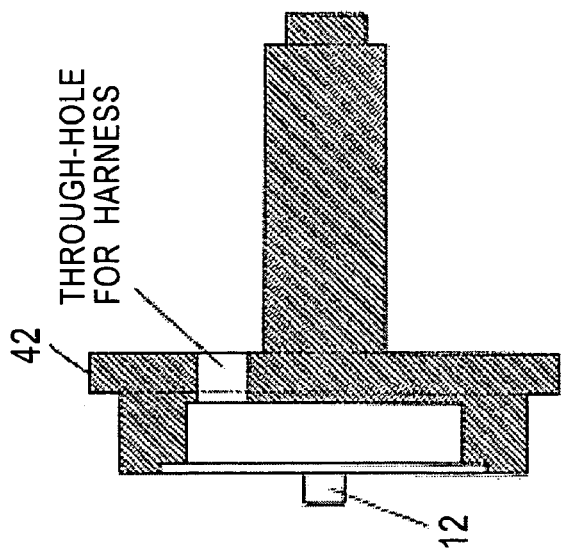
FIGS. 8A, 8B and 8C show a plan view, a side elevation view, and a longitudinal sectional view of an output X-shaft, respectively.
Figure 8B:
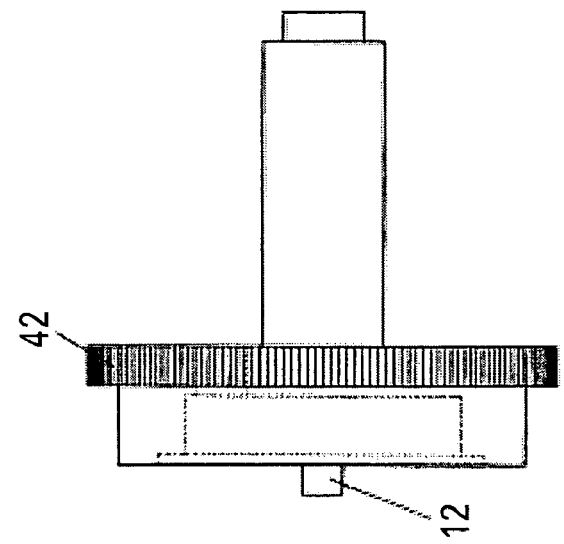
Figure 8C:
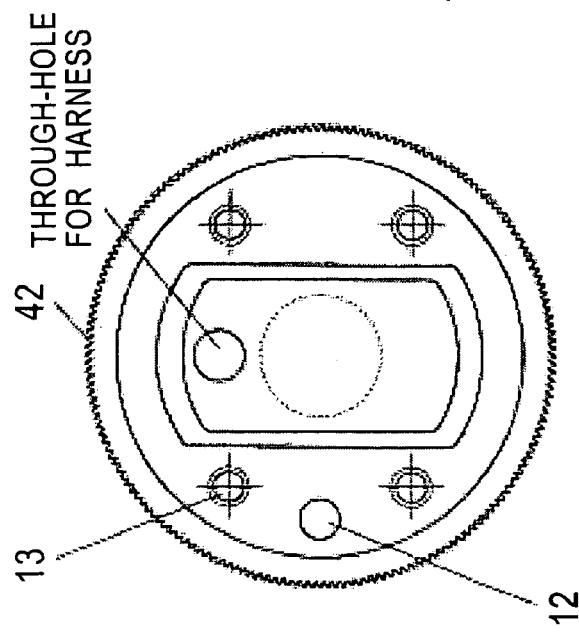

As shown in FIG. 5, the output X-shaft 11 of the actuator unit is rotatably supported by bearings 43 and 44, as described above. FIGS. 8A, 8B and 8C show an elevation view, a side elevation view, and a sectional side elevation view of the output X-shaft 11, respectively.

An electric contact 46 is exposed on an end face of the output X-shaft 11, and a plurality of threaded holes 13 or a detent pin 12 for fixing a support structure, such as a linkage or a housing, are disposed on the end face of the output X-shaft 11. The threaded holes 13 and the detent pin 12 are used for fixing a socket in place, which is mechanically engaged to and is electrically in contact with the end face of the output shaft, as described above.

A gear portion 42 is coupled with the output end of the output X-shaft 11. The gear portion 42 is engaged with a pinion gear 62 (as described above), which transfers rotation of the motor 41 to the output X-shaft 11. Thus, the rotation of the motor 41 changes to a driving force in the output X-shaft 11.

As shown in FIG. 5, the output Y-shaft 14 is rotatably supported by bearings 53 and 54 (as described above). FIGS. 9A, 9B and 9C show an elevation view, a side elevation view, and a sectional side elevation view of the output Y-shaft 14.

Similarly, an electric contact 56 is exposed on an end face of the output Y-shaft 14, and a plurality of threaded holes 13 or a detent pin 12 for fixing a support structure, such as a linkage or a housing, are disposed on the end face of the output Y-shaft 14. The threaded holes 13 and the detent pin 12 are used for fixing a socket in place, which is mechanically engaged to and is electrically in contact with the end face of the output shaft, as described above.

A gear portion 52 is coupled with the output end of the output Y-shaft 14. The gear portion 52 is engaged with a pinion gear 62 (described above), which transfers rotation of the motor 51 to the output Y-shaft 14. Thus, the rotation of the motor 51 changes to a driving force in the output Y-shaft 14.

As described above, the output X-shaft 11 has a length substantially identical to the depth of the U-shaped housing while the output Y-shaft 14 has a length smaller than substantially a half of the height of the housing. As a result, the output Y-shaft 14 does not interfere with the output X-shaft 11. A comparison of FIGS. 8A to 8C and FIGS. 9A to 9C indicates that the output Y-shaft 14 is shorter than the output X-shaft 11.

Figure 10A:
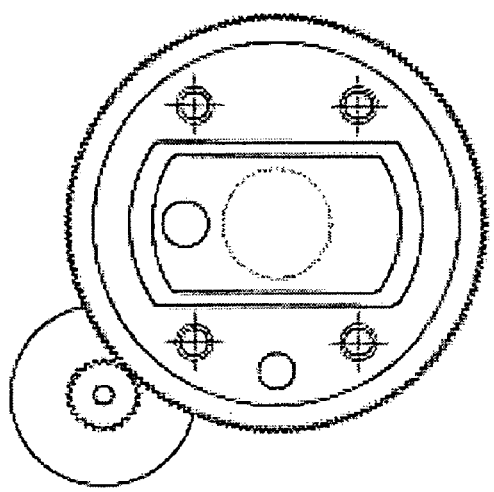
FIGS. 10A and 10B show relative positions of the motor and the output Y-shaft.
Figure 10B:
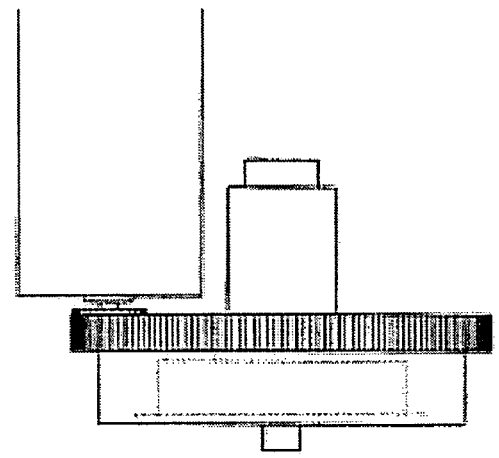

FIGS. 10A and 10B show relative positions of the motor 51 and the output Y-shaft 14. Relative positions of the motor 41 and the output X-shaft 11 (not shown) are substantially the same except for the length of the shaft.

A pinion gear 62 is attached to a shaft of the motor 51, as described above. The pinion gear 62 is disposed in the actuator unit such that it engages with the gear portion 52 around the output Y-shaft 14, which is parallel to the shaft of the motor 51. The gear portion 52 is rotatably supported by the bearing 53. Speed of a rotation of the motor 51 is reduced at a reduction ratio determined by the number of teeth of the pinion gear 62 and the gear portion 52, and then the rotation is transferred to the output Y-shaft 14.

In this example shown in the drawing, a single-stage reduction mechanics is employed. One or more gears may be added between the pinion gear 62 and the gear portion 52 to achieve a multi-stage reduction mechanics, thereby obtaining a desired reduction ratio.

Referring again to FIG. 5, a harness 57 extending from the electric contact 56 is wound around a shaft 55 in several turns and then is connected to a control board 40 in the actuator unit. Similarly, a harness (not shown) extending from the electric contact 46 is wound around a shaft 45 in several turns and then is connected to the control board 40 in the actuator unit.

Winding the harnesses around the shafts connected to the motors prevents the harnesses from being cut when the output shafts rotate (in the range of about −180 degree to about +180 degree). Also, this winding structure suppresses metal fatigue of the harness 57 even if the output shaft rotates numerous times.

The present invention has been described in detail with reference to the specific embodiment. However, it is apparent for those skilled in the art that numerous and various modifications and alternatives can be made without departing from the spirit of the present invention.

Accordingly, the above disclosure is not limited to products referred to as "robots". That is, the disclosure is also applicable to other industrial products such as toys that simulate human movements electrically or magnetically.

In other words, the present invention is not intended to be limiting to the above embodiments and the scope of the invention should be determined by the appended claims and their legal equivalents.

What is claimed is:

1. An actuator unit comprising:
    two motors;
    output shafts drivingly connected to rotors of the motors;
    a housing covering the motors;
    terminal free ends of the output shafts being exposed to the exterior of the housing; and
    electric contacts on the terminal free ends of the output shafts for electric power and a control signal.

2. An actuator unit according to claim 1, further comprising a speed-reducer disposed around each of the output shafts and configured to reduce a rotational speed of the output shaft at a predetermined ratio.

3. An actuator unit according to claim 1, wherein the terminal free end of each of the output shafts has threaded holes or a detent pin for fixing a support structure.

4. An actuator unit according to claim 1, further comprising built-in control-circuit components including a microprocessor.

5. An actuator unit according to claim 4, further comprising harnesses extending from the electric contacts and wound around the shafts in several turns, and connected to the control-circuit components.

6. An actuator unit according to claim 1, wherein the output shafts of the two motors are orthogonally disposed.

7. An actuator unit according to claim 6, wherein electric power and a control signal are input to an electric contact on the terminal free end of the output shaft of one of the motors.

8. An actuator unit comprising:
two motors;
output shafts drivingly connected to rotors of the motors;
a housing covering the motors;
free ends of the output shafts being exposed to the exterior of the housing; and
electric contacts on the free ends of the output shafts for electric power and a control signal,
wherein the output shafts of the two motors are orthogonally disposed,
wherein electric power and a control signal are input to an electric contact on the free end of the output shaft of one of the motors, and
wherein the electric contact on the free end of the output shaft of the other motor, which is not used for the input, outputs the electric power and the control signal to actuate another actuator.

9. An actuator unit comprising:
a first container accommodating a first motor configured to drive a first output shaft in rotation about a first axis, the first container having a first bearing portion to support the first output shaft; and
a second container accommodating a second motor configured to drive a second output shaft in rotation about a second axis, the second container having a second bearing portion to support the second output shaft
wherein the first output shaft and the second output shaft are substantially orthogonally disposed, and
wherein the first axis and the second axis are coplanar.

10. An actuator unit according to claim 9, further comprising a speed-reducer disposed around the first output shaft configured to reduce a rotational speed of the first output shaft at a predetermined ratio.

11. An actuator unit according to claim 9, further comprising an electric contact for electric power and a control signal disposed on a free end of the first output shaft connected to the first motor.

12. An actuator unit according to claim 9, wherein a free end of each of the first and second output shafts has threaded holes or a detent pin for fixing a support structure.

13. An actuator unit according to claim 9, further comprising a built-in control-circuit component including a microprocessor which controls the first and second motors.

14. An actuator unit according to claim 13, further comprising harnesses extending from the respective electric contacts and wound around the respective output shafts in several turns, and connected to the control-circuit component.

15. An actuator unit according to claim 13, wherein electric power and a control signal are input to an electric contact on a free end of the output shaft connected to one of the motors and are output from an electric contact on the free end of the output shaft connected to the other motor.

16. A multi-axis robot comprising:
at least two actuator units functioning as joints having high degrees of freedom, each actuator unit comprising two motors output shafts of which are orthogonally disposed and have electric contacts on terminal free ends of the output shafts.

17. A multi-axis robot according to claim 16, wherein threaded holes or a detent pin for fixing a support structure are disposed on the free ends of the output shafts, and the actuator units are combined with the support structures.

18. A multi-axis robot according to claim 16, wherein a daisy-chain configuration is employed in which electric power and control signal are transmitted from upper to lower actuator units.

19. A multi-axis robot comprising:
at least two actuator units functioning as joints having high degrees of freedom, each actuator unit comprising two motors output shafts of which are orthogonally disposed and have electric contacts on the free ends of the output shafts, wherein at least three actuator units are combined so that the output X-shaft and the output Y-shaft of the first actuator unit correspond to a roll axis and a pitch axis of the hip joint, respectively, and the output X-shaft and the output Y-shaft of the second actuator unit correspond to a pitch axis and a roll axis of the knee joint, respectively, and the output X-shaft and the output Y-shaft of the third actuator unit correspond to a pitch axis and a roll axis of the ankle joint, respectively.

20. A multi-axis robot comprising:
at least two actuator units functioning as joints having high degrees of freedom, each actuator unit comprising two motors output shafts of which are orthogonally disposed and have electric contacts on the free ends of the output shafts,
wherein, in each of the actuator units, electric power and a control signal are input into an electric contact on the free end of the output shaft connected to one of the motors and are output from an electric contact on the free end of the output shaft connected to the other motor, which is not used for the input, to actuate another actuator.

* * * * *